G. A. Jasper,
Exhaust Mechanism for Locomotives.
N° 60,379. Patented Dec. 11, 1866.
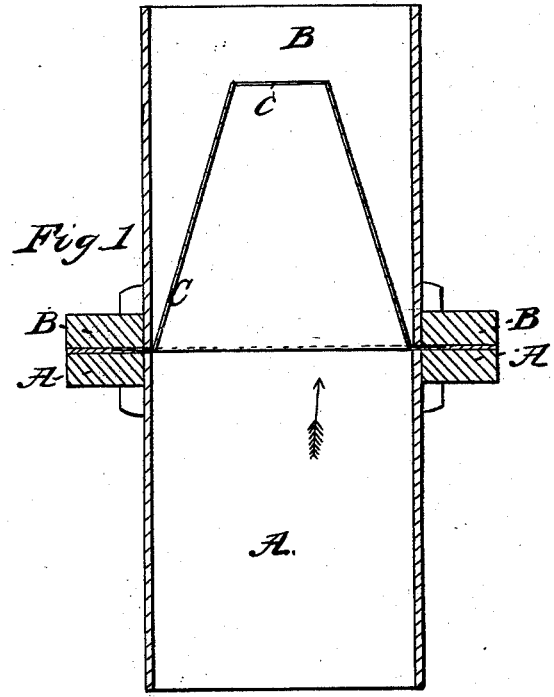
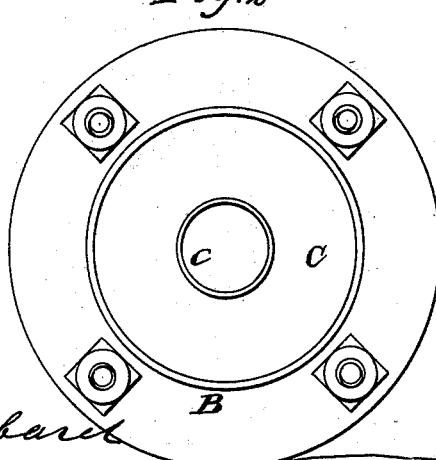
Witnesses:
Wm. C. Hibbard
N. C. Lombard
Inventor:
Gustavus A. Jasper

United States Patent Office.

IMPROVEMENT IN STEAM PIPES.

G. A. JASPER, OF CHARLESTOWN, MASSACHUSETTS.

Letters Patent No. 60,379, dated December 11, 1866.

The Schedule referred to in these Letters Patent and making part of the same.

TO ALL WHOM IT MAY CONCERN:

Be it known that I, GUSTAVUS A. JASPER, a citizen of Germany, now residing in Charlestown, in the county of Middlesex, and State of Massachusetts, have invented new and improved method of using steam for various purposes; and I do hereby declare that the following is a full, clear, and exact description of the same, taken in connection with the accompanying drawings, making a part of this specification.

The subject matter of my invention is an apparatus to be used in the pipe or passage that conducts the steam from the boiler to the place where it is used, by means of which the steam is better controlled and rendered more efficient.

This apparatus is more especially applicable to those instances where the steam is employed for heating; such, for instance, as the boiling of sugar in the vacuum pan, boiling goods in bleacheries, heating rooms, and other uses of a like nature, in which the heat of the steam is the property that is utilized. My improvement consists in placing in the steam pipe or conductor near to the place where the steam does its work, a diaphragm or reducing pipe, which I call a register, which has an orifice through it of such an area as will just supply the required amount of steam, when the steam in the pipe on the side of the register toward the boiler is carried at a pressure, say sixty pounds, more or less, above the atmosphere; by means of which the steam is delivered to its work at such a lower pressure as the conditions of the work may require.

The general advantages which have been found to flow from the use of this improvement are, first, the ability to use at one time steam of various pressures or temperatures, for various purposes, all drawn from the same source of supply; second, the prevention of any great disturbance or fluctuation of the pressure of the steam in the source of supply by means beyond the control of the operatives, so that the conditions of the working of the steam remain substantially constant; and third, the rendering of the steam more efficient in use in proportion to the weight of water evaporated.

To illustrate the application of my improvement, I will take the case of a sugar refinery to which it has been applied, in which a variety of conditions are exemplified which have direct relations to its use. The steam is used in the refinery for three general purposes: first, to boil the sugar in the vacuum pan by means of heating surfaces; second, to drive the various steam engines employed in the works; and third, the heating of liquids and other matters by injecting the steam directly into the mass to be heated; and for all these purposes the steam is supplied from a common source. To work the vacuum pan properly, the pressure of the steam in the worm should not exceed thirty pounds per square inch above the atmosphere, as a greater pressure gives so great a heat to the surface of the worm as to injure the goods; while to drive the engines properly the pressure should be sixty pounds, or greater; and for the other purposes of the house a low pressure and a limited supply only is necessary. When the steam is first admitted to the pan charged with cold syrup, the condensation is so enormous as to reduce the pressure in the boiler, if the steam is allowed to enter the worm freely, and thus embarrass the working of the engines and the other operations of the house, and it also tends to produce wet steam in the boilers. The same considerations also apply to a greater or less degree to the blowing up of the sugar, and the other minor operations of the refinery. In each of these departments the workman has it in his power to embarrass all the other departments, as refineries are usually worked; but with the use of the register plates, having just the size of the orifice that will discharge steam enough to do the work properly at each place where it is to be used, this difficulty is prevented. Again, it is now considered that with equal weights high steam contains more heat than low steam, so that when pure saturated steam of a high pressure is reduced in pressure by allowing it to escape through an orifice into a lower pressure, the resultant steam is superheated, or has more heat than steam of the same pressure formed directly from water, so that the lower steam after passing the register is drier and more efficient than if generated at that pressure. Again, as the same weight of high steam occupies less space than low steam, the efficiency of the conducting pipes and all steam spaces of a given size is much greater with the first than with the last, and there is also a diminished liability of the boiler to produce wet steam. All these various conditions are provided for effectually by the use of registers in the steam pipes near the places where steam is used for heating purposes, each having the capacity to allow only the requisite amount of steam to pass to do its appropriate work; and as compared with the working of the refinery without this apparatus, but with the same steam generator, the advantages which have been gained in practice have been great and decisive as to its utility.

In the drawings, fig. 1 represents a longitudinal section through the centre of an ordinary flange joint in a steam pipe, with the register plate inserted in the same, and fig. 2 is a plan of the same. A and B are the contiguous ends of two pieces of pipe, the end A being toward the boiler, and C is the register plate, securely held between the flanges, as shown, and having an orifice, c, of the proper area to permit the requisite amount of steam to pass when the pressure upon the side, A, is, say, sixty pounds per square inch above the atmosphere, and upon the side, B, is, say, twenty-five pounds, or any other pressure that may be assumed. The orifice through the register plate shown in the drawing is in the form of a short conical pipe, but a simple plate with an orifice through it placed in the joint will produce the same result. But I have employed the form shown, which I think produces less whistling of the steam in passing it, and it is a stronger form to resist the pressure of the steam than a flat plate, and is less easily tampered with by the operatives. The several steam pipes are provided with the usual stop valves for controlling the steam in the usual manner, while at the same time all such injudicious use of it as would embarrass the other operations of the works is effectually prevented. In the pipes leading to the engines in constant work the register would not be employed, but in those used temporarily and without governors they might be useful in certain cases. The manner of applying this device, and the size of the orifice used, would obviously vary with the conditions of each case, but in the refinery where I have already applied it a good result has been obtained under the following conditions, namely: Steam in the boiler about sixty pounds per square inch; vacuum pan eleven feet diameter; heating surface of same, two worms and a jacket; orifice in register for jacket, three fourths of an inch in diameter; orifice in registers for each worm, one and one-fourth inch in diameter; diameter of orifice for six blow-ups, one and one-fourth inch; for the scum pan, three fourths of an inch; for tank for heating water, one half inch.

These examples, it is believed, will sufficiently direct the constructor how to adapt the register to any locality where it may be required.

What I claim as my invention, and desire to secure by Letters Patent, is—

The register as a device, to be used in combination with a steam apparatus for the purpose of more efficiently controlling and utilizing the steam, substantially as described.

Executed at Boston this 8th day of May, 1866.

GUSTAVUS A. JASPER.

Witnesses:
　WM. C. HIBBARD,
　N. C. LOMBARD.